US011544920B2

(12) United States Patent
Li et al.

(10) Patent No.: US 11,544,920 B2
(45) Date of Patent: *Jan. 3, 2023

(54) USING EMPIRICAL EVIDENCE TO GENERATE SYNTHETIC TRAINING DATA FOR PLANT DETECTION

(71) Applicant: X Development LLC, Mountain View, CA (US)

(72) Inventors: Lianghao Li, Redwood City, CA (US); Kangkang Wang, San Jose, CA (US); Zhiqiang Yuan, San Jose, CA (US)

(73) Assignee: X DEVELOPMENT LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/463,360

(22) Filed: Aug. 31, 2021

(65) Prior Publication Data

US 2021/0397836 A1 Dec. 23, 2021

Related U.S. Application Data

(63) Continuation of application No. 16/877,138, filed on May 18, 2020, now Pat. No. 11,113,525.

(51) Int. Cl.
*G06K 9/62* (2022.01)
*G06V 20/10* (2022.01)
*G06N 3/08* (2006.01)

(52) U.S. Cl.
CPC ......... *G06V 20/188* (2022.01); *G06K 9/6256* (2013.01); *G06K 9/6267* (2013.01); *G06N 3/08* (2013.01)

(58) Field of Classification Search
CPC ........... G06K 9/00798; G06K 9/00885; G06K 9/3275; G06K 9/46; G06K 9/6256;
(Continued)

(56) References Cited

U.S. PATENT DOCUMENTS

2015/0015697 A1* 1/2015 Redden .................... A01G 7/00
382/110
2018/0286117 A1 10/2018 Redden et al.
(Continued)

FOREIGN PATENT DOCUMENTS

| CN | 101894388 | 11/2010 | |
| WO | 2018173622 | 5/2020 | |
| WO | WO-2020110063 A1 * | 6/2020 | ........... A01G 25/167 |

OTHER PUBLICATIONS

Douarre, C. et al., "Novel Data Augmentation Strategies to Boost Supervised Segmentation of Plant Disease;" Computers and Electronics in Agriculture, Elsevier, vol. 165; 15 pages; Aug. 30, 2019.
(Continued)

*Primary Examiner* — Quan M Hua
(74) *Attorney, Agent, or Firm* — Middleton Reutlinger

(57) ABSTRACT

Implementations are described herein for automatically generating synthetic training images that are usable as training data for training machine learning models to detect, segment, and/or classify various types of plants in digital images. In various implementations, a digital image may be obtained that captures an area. The digital image may depict the area under a lighting condition that existed in the area when a camera captured the digital image. Based at least in part on an agricultural history of the area, a plurality of three-dimensional synthetic plants may be generated. The synthetic training image may then be generated to depict the plurality of three-dimensional synthetic plants in the area. In some implementations, the generating may include graphically incorporating the plurality of three-dimensional synthetic plants with the digital image based on the lighting condition.

20 Claims, 6 Drawing Sheets

(58) Field of Classification Search
CPC ........ G06K 9/6267; G06T 2207/10004; G06T 2207/20152; G06T 7/00; G06T 7/10; G06T 7/60; G06N 3/08; G06N 3/02; G06N 3/04; G06N 5/003; G06N 7/005
See application file for complete search history.

(56) References Cited

U.S. PATENT DOCUMENTS

| | | |
|---|---|---|
| 2019/0179982 A1 | 6/2019 | Reese et al. |
| 2019/0377946 A1 | 12/2019 | Genty et al. |
| 2019/0385018 A1 | 12/2019 | Ngo Dinh et al. |

OTHER PUBLICATIONS

Nazki, H. et al., "Unsupervised Image Translation Using Adversarial Networks for Improved Plant Disease Recognition;" Computers and Electronics in Agriculture, Elsevier, vol. 168; 14 pages; Dec. 20, 2019.

Liu, Bo et al.; Weed Detection for Selective Spraying: a Review; Current Robotics Reports; Springer; pp. 19-26 dated Jan. 31, 2020.

Di Cicco, Maurilio et al.; Automatic model based dataset generation for fast and accurate crop and weeds detection; 8 pages; dated 2017.

Asad, Muhammad, et al.; Weed Detection in Canola Fields Using Maximum Likelihood Classification and Deep Convolutional Neural Network; Information Processing in Agriculture; 11 pages; dated 2019.

Alhnaity, Bashar et al.: Using Deep Learning to Predict Plant Growth and Yield in Greenhouse Environments; 8 pages; dated 2019.

Jones, G., et al.; Crop/Weed Discrimination In Simulated Agronomic Images; Proceedings of SPIE—The International Society for Optical Engineering; 8 pages; dated 2007.

Olsen, Alex et al.; Deepweeds: A Multiclass Weed Species Image Dataset for Deep Learning; Scientific Reports; 12 pages; dated 2019.

Lammie, Corey et al.; Low-Power and High-Speed Deep FPGA Inference Engines for Weed Classification at the Edge; IEEE; 15 pages; dated 2019.

Duarre, C. et al.; Novel Data Augmentation Strategies to Boost Supervised Segmentation of Plant Disease; Computers and Electronics in Agriculture; Elsevier; vol. 165; 15 pages; dated Aug. 30, 2009.

\* cited by examiner

USING EMPIRICAL EVIDENCE TO GENERATE SYNTHETIC TRAINING DATA FOR PLANT DETECTION

BACKGROUND

Classification of plants in digital imagery has numerous applications. One particularly useful application is detection, classification, and/or segmentation of unwanted, undesirable, and/or invasive plants, sometimes referred to as "weeds." Various types of machine learning models can be trained to segment and/or recognize various types of plants such as weeds in digital images. Convolutional neural networks are one popular example. However, the accuracies of these machine learning models depends largely on the amount of training data used to train them. Annotating training images can be prohibitively costly, especially where the images are annotated on a pixel-wise basis. Moreover, images of undesirable plants such as weeds may not be as widely available or easily acquired as images of desirable plants such as crops.

SUMMARY

Implementations are described herein for automatically generating synthetic training images that are usable as training data for training machine learning models to detect, segment, and/or classify various types of plants in digital images. Annotation of these synthetic training images can be performed automatically as part of the generation process, even at a per-pixel level, significantly reducing or eliminating the costs associated with creating annotated training data from real-life digital images. In various implementations, synthetic aspects of these synthetic training images may be generated based at least in part on empirical evidence associated with an agricultural area.

In various implementations, a plurality of three-dimensional ("3D") synthetic plants may be generated individually so that they are distinct from each other. Various aspects of each synthetic plant, including but not limited to leaf shapes/contours, leaf sizes, leaf textures, height, leaf counts, flower/fruit counts, etc., may be generated, at least in part, randomly, stochastically, and/or non-deterministically. These 3D synthetic plants may then be graphically incorporated into a real-life digital image that captures an area of agricultural interest such as a field, plot, garden, etc. The resulting synthetic training image may then be used to train machine learning models to detect, for instance, the same types of plants that are represented by the 3D synthetic plants.

In some implementations, the 3D synthetic plants may be generated to reflect empirical evidence (also referred to as "ground truth" data), such as observable attributes of the real-life digital image and/or the area it captures. These observable attributes may include, for instance, a lighting condition that existed in the area when the digital image was captured, as well as a perspective of the camera that captured the image. For example, based on the lighting condition (e.g., sun angle, cloud cover, rain, etc.), shadows may be rendered at locations of the underlying soil, on the synthetic plants themselves, or on other "real" plants that are depicted in the real-life digital image. These shadows may make the resulting synthetic training image more realistic, which may facilitate more effective machine learning model training.

In some implementations, to create a synthetic training image, the 3D synthetic plants may be generated and/or graphically incorporated with the digital image that captures the area to reflect an agricultural history of the area that existed at and/or leading up to the moment the digital image of the area was acquired. For example, the agriculture history of the area may include environmental conditions and/or stewardship factors such as temperature, precipitation, sunlight exposure, fertilizer application, soil composition, pH levels, pest infestation, and/or pesticide application, to name a few. These data may be taken into account when generating the 3D synthetic plants.

Suppose the type of plant being simulated by the 3D synthetic plants requires a lot of sunlight, and that the environmental conditions during a time interval (e.g., days, weeks) leading up to the captured image include relatively few sunny days/hours. The generated 3D synthetic plants may reflect this, e.g., by being smaller, less developed, blocked by other more hearty plants depicted in the real-life digital image, sparsely distributed in the area, etc. Notably, spacing of these 3D synthetic plants may be selected based on these environmental conditions and/or other plants already growing in the area. As one example, if the area includes a healthy crop of a desired type of plant (e.g., strawberries, soybeans, etc.), these desired plants may effectively "choke out" undesirable plants such as weeds. Consequently, less 3D synthetic plants may be generated, and/or the ones that are generated may be spaced further apart and/or more sparsely to reflect the inhospitable (to them) environment.

In some implementations, the agricultural data may include time-series data, such as periodic soil measurements, periodic pH measurements, records of fertilizer and/or pesticide deployment, etc. This time series empirical data may be used to generate 3D synthetic plants. For example, a time-series machine learning model such as a recurrent neural network, a long short-term memory ("LSTM"), a gated recurrent unit ("GRU") network, etc., may be used with this time-series data to generate the 3D synthetic plants. For example, a new 3D version of the plant may be generated at each iteration based on the previous iteration's output and the current iteration's corresponding environmental data. In some implementations, a generative adversarial network ("GAN") may be employed to train a machine learning model to generate synthetic training images, e.g., using ground truth underlying digital images and 3D plant models, such that the synthetic training images are realistic enough to be used to train a plant detection model.

In some implementations, another time-series machine learning model such as another RNN, LSTM, GRU, etc., may be trained to detect/classify/segment targeted plants such as weeds in images. Such a time-series machine learning model may be trained, for instance, using synthetic training images generated as described previously, in combination with time-series agricultural data. For example, temporal sequence of synthetic training images of an area may be generated. The 3D synthetic plants may change across each successive synthetic training image, e.g., by growing larger and fuller if the conditions are favorable or wilting if the conditions are unfavorable. In some implementations, the progression of these 3D synthetic plants may result from the processing of the time-series agricultural data as described above. Additionally, this temporal sequence of synthetic training images may be iteratively applied, along with corresponding time-series data, as inputs for the time-series plant detection machine learning model. Any error in the detection or classification of targeted plants may be used to train the time-series machine learning model. Such a time-series model may also be trained with ground truth data such as temporal sequences of real (i.e. non-synthetic) images of targeted plants over time.

In some implementations, a method for generating a synthetic training image may include: obtaining a digital image that captures an area, wherein the digital image depicts the area under a lighting condition that existed in the area when a camera captured the digital image; based at least in part on an agricultural history of the area, generating a plurality of three-dimensional synthetic plants; and generating the synthetic training image to depict the plurality of three-dimensional synthetic plants in the area, wherein the generating includes graphically incorporating the plurality of three-dimensional synthetic plants with the digital image based on the lighting condition.

In various implementations, the agricultural history of the area may include time-series data corresponding to a plurality of environmental conditions of the area, wherein the generating is based on the time-series data. In various implementations, the plurality of environmental conditions may include two or more of temperature, precipitation, sunlight exposure, fertilizer application, soil composition, pH levels, or pesticide application.

In various implementations, the agricultural history may include a plurality of environmental conditions that existed in the area during a time interval preceding capture of the digital image that captures the area. In various implementations, the graphically incorporating may include spacing the plurality of three-dimensional synthetic plants from each other in the synthetic training image based on the environmental conditions.

In various implementations, the graphically incorporating may include spacing the plurality of three-dimensional synthetic plants from each other in the synthetic training image based on one or more plants already depicted in the digital image. In various implementations, the method may further include using the synthetic training image to train a machine learning model to segment or detect, in digital images, plants of a same type as at least some of the three-dimensional synthetic plants.

In addition, some implementations include one or more processors (e.g., central processing unit(s) (CPU(s)), graphics processing unit(s) (GPU(s)), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
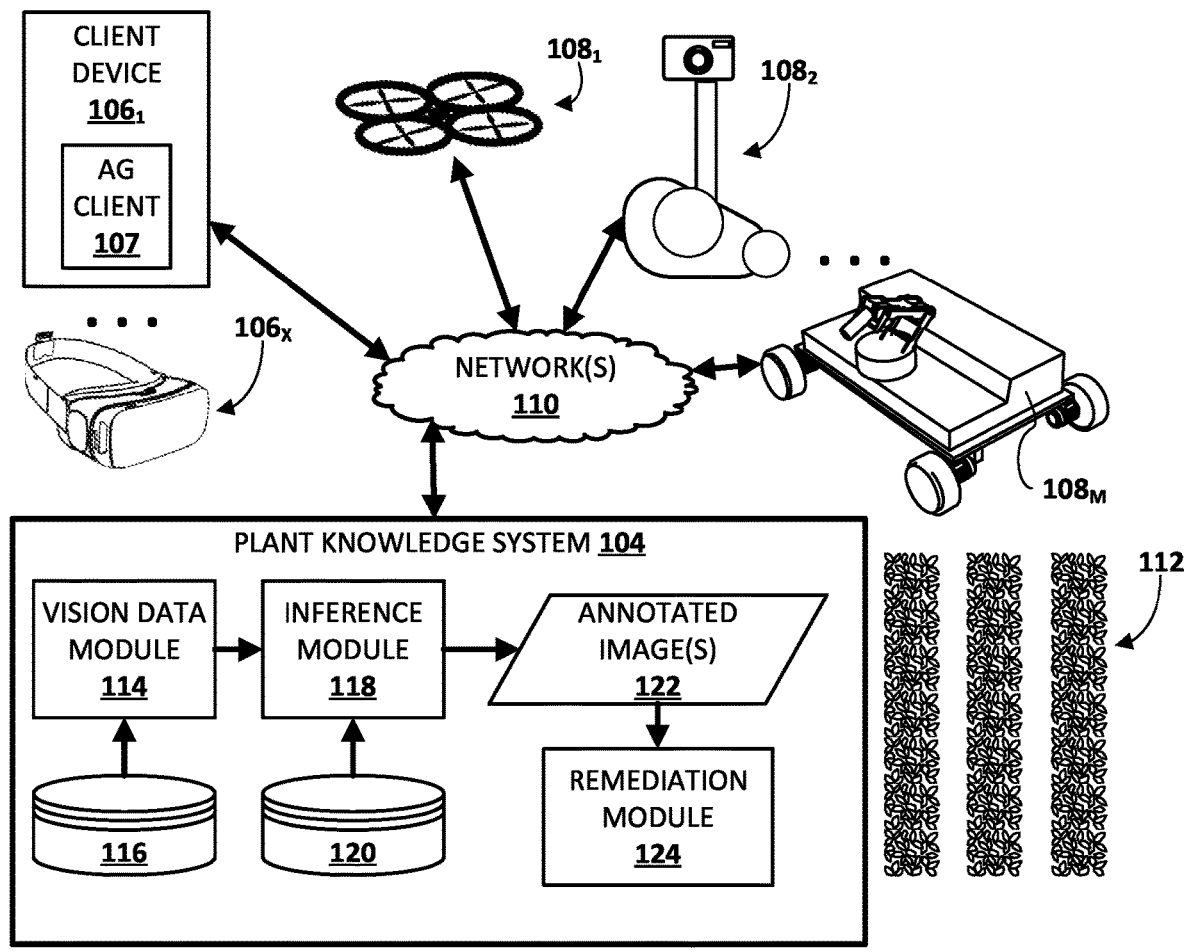
FIG. 1 schematically depicts an example environment in which selected aspects of the present disclosure may be employed in accordance with various implementations.

FIG. 1 schematically illustrates an environment in which one or more selected aspects of the present disclosure may be implemented, in accordance with various implementations. The example environment includes one or more agricultural areas 112 and various equipment that may be deployed at or near those areas, as well as other components that may be implemented elsewhere, in order to practice selected aspects of the present disclosure. Various components in the environment are in communication with each other over one or more networks 110. Network(s) 110 may take various forms, such as one or more local or wide area networks (e.g., the Internet), one or more personal area networks ("PANs"), one or more mesh networks (e.g., ZigBee, Z-Wave), etc.

Agricultural area(s) 112 may be used to grow various types of crops that may produce plant parts of economic and/or nutritional interest. Agricultural area(s) 112 may include, for instance, one or more crop fields, one or more plots, one or more gardens, one or more greenhouses, or any other areas in which there may be an interest or desire to automatically detect, classify, and/or segment particular types of plants. As one non-limiting example, there may be considerable interest and/or benefit in automatically detecting undesired plants, sometimes referred to as "weeds," in an area 112 in which other desired plants are being grown. Once detected, various remedial actions may be taken, such as flagging the weeds' locations for removal or treatment (e.g., herbicide application) by agricultural personnel and/or farming equipment.

Desired plants may take any form depending on the circumstances, and may include, but are not limited to, plants such as strawberry plants, soybeans, beans, corn, cabbage, lettuce, spinach, wheat, berries, etc. Undesired plants or weeds may include, but are not limited to, dandelions, waterhemp, giant ragweed, marestail (also commonly known as horseweed), common lambsquarters, common groundsel, field pansy, mayweed or dog fennel, pineappleweed or chamomile, several pigweeds, and white campion, yellow woodsorrel, yellow nutsedge, etc.

An individual (which in the current context may also be referred to as a "user") may operate one or more client devices $106_{1-X}$ to interact with other components depicted in FIG. 1. A client device 106 may be, for example, a desktop computing device, a laptop computing device, a tablet computing device, a mobile phone computing device, a computing device of a vehicle of the participant (e.g., an in-vehicle communications system, an in-vehicle entertainment system, an in-vehicle navigation system), a standalone interactive speaker (with or without a display), or a wearable apparatus that includes a computing device, such as a head-mounted display ("HMD") $106_X$ that provides an AR or VR immersive computing experience, a "smart" watch, and so forth. Additional and/or alternative client devices may be provided.

Plant knowledge system 104 is an example of an information system in which the techniques described herein may be implemented. Each of client devices 106 and plant knowledge system 104 may include one or more memories for storage of data and software applications, one or more processors for accessing data and executing applications, and other components that facilitate communication over a network. The operations performed by client device 106 and/or plant knowledge system 104 may be distributed across multiple computer systems.

Each client device 106 may operate a variety of different applications that may be used to perform various agricultural tasks, such as crop yield prediction and diagnosis. For example, a first client device $106_1$ operates agricultural ("AG") client 107 (e.g., which may be standalone or part of another application, such as part of a web browser). Another client device $106_X$ may take the form of a HMD that is configured to render 2D and/or 3D data to a wearer as part of a VR immersive computing experience. For example, the wearer of client device $106_X$ may be presented with 3D point clouds representing various aspects of objects of interest, such as fruits of crops, weeds, crop yield predictions, etc. The wearer may interact with the presented data, e.g., using HMD input techniques such as gaze directions, blinks, etc.

In some implementations, AG client 107 may be used to communicate to agricultural personnel instructions and/or information that can help them perform various agricultural tasks. For example, a remediation module 124 (described in more detail below) may generate a report, a map, instructions, and/or any other data that may be presented to an operator of a client device using a graphical user interface, audibly, etc. These data may inform the agricultural personnel where targeted plants such as weeds are located, what action(s) should be taken on those plants, a timeframe in which those action(s) should be taken, etc.

In some implementations, one or more robots $108_{1-M}$ may be deployed to perform various agricultural tasks. Performance of some of these tasks, including but not limited to weed remediation, may be performed using machine learning model(s) trained on synthetic training data created using techniques described herein. An individual robot $108_{1-M}$ may take various forms, such as an unmanned aerial vehicle $108_1$, a robot (not depicted) that is propelled along a wire, track, rail or other similar component that passes over and/or between crops, wheeled robots $108_2$ to $108_M$, or any other form of robot capable of being propelled or propelling itself past crops of interest.

In some implementations, different robots may have different roles, e.g., depending on their capabilities. For example, in some implementations, one or more of robots $108_{1-M}$ may be designed to capture data, others may be designed to manipulate plants or perform physical agricultural tasks, and/or others may do both. Robots 108 may include various types of sensors, such as vision sensors (e.g., 2D digital cameras, 3D cameras, 2.5D cameras, infrared cameras), inertial measurement unit ("IMU") sensors, Global Positioning System ("GPS") sensors, X-ray sensors, moisture sensors, lasers, barometers (for local weather information), photodiodes (e.g., for sunlight), thermometers, etc.

In various implementations, plant knowledge system 104 may be implemented across one or more computing systems that may be referred to as the "cloud." Plant knowledge system 104 may receive vision data generated by robots $108_{1-M}$ (and/or robots at other agricultural sites and process it using various image processing techniques to perform tasks such as plant detection, classification, and/or segmentation. In various implementations, plant knowledge system 104 may include a vision data module 114 and an inference module 118. In some implementations one or more of modules 114 and 118 may be omitted, combined, and/or implemented in a component that is separate from plant knowledge system 104.

Plant knowledge system 104 may also include one or more databases. For example, plant knowledge system 104 may include, in communication with vision data module 114, an imagery database 116 for storing image data captured by, for instance, agricultural personnel and/or one or more robots $108_{1-M}$. Plant knowledge system 104 may also include a machine learning model database 120 that includes one or more machine learning models that are trained based on synthetic training data generated using techniques described herein. In this specification, the term "database" and "index" will be used broadly to refer to any collection of data. The data of the database and/or the index does not need to be structured in any particular way and it can be stored on storage devices in one or more geographic locations.

Vision data module 114 may be configured to obtain digital images and/or other imagery data from various sources, such as imagery database 116 purposed as an imagery clearinghouse, as well as from sources such as robots $108_{1-M}$. Vision data module 114 may then provide these imagery data to inference module 118. In other implementations, vision data module 114 may be omitted and the functions described herein as being performed by vision data module 114 may be performed by other components of plant knowledge system 104, such as inference module 118.

Inference module 118 may be configured to apply imagery data received from vision data module 114 as input across various machine learning models stored in machine learning model database 120 to generate output. This output may be indicative of plants that are detected, segmented, and/or classified in imagery data received from vision data module 114. To this end, machine learning models stored in database 120 may be trained to detect, classify, and/or segment plants within imagery data, such as two-dimensional digital images of agricultural area(s) 112 captured by agricultural personnel and/or by robot(s) 108.

Various types of machine learning models may be trained, e.g., using synthetic training data generated using techniques described herein, to detect, classify, and/or segment particular types plants in imagery data. In some implementations, a convolutional neural network ("CNN") may be trained to generate output indicative of one or more types of plants detected in digital imagery. In FIG. 1, for instance, inference module 118 generates annotated image(s) 122 that include pixel-wise annotations identifying one or more detected plants. These pixel-wise annotations may be used, for instance, to segment the digital image into portions showing targeted plant types, such as weeds. In some such implementations, a remediation module 124 may be configured to take remedial action using these annotated and/or segmented images 122. For example, in some implementations, remediation module 124 may deploy one or more robots 108 to take remedial action on the detected plants, such as pulling weeds, spraying weeds with chemicals, destroying weeds using other mechanical and/or energy-based means, harvesting desired plant parts (e.g., fruits, flowers, etc.), and so forth. In other implementations, inference module 118 may output one or more probabilities that one or more plant types are detected in an image. In some implementations, remediation module 124 may provide output that includes, for instance, weed remediation instructions and/or a map of weeds for remediation by agricultural personnel.

In some implementations, one or more components of plant knowledge system 104 may be implemented in whole or in part on a robot 108. For example, inference module 118 may be implemented in whole or in part on a robot 108 that is also equipped with a vision sensor such as a two-dimensional camera. By having an onboard inference module 118, robot 108 may be able to process its own images to quickly detect targeted plants, such as weeds. Robot 108 may also include its own remediation module 124 that enables robot 108 to take remedial action, such as destroying or otherwise remediating the detected plant(s).

As noted previously, obtaining sufficient ground truth training data to train machine learning model(s) such as CNNs to detect particular types of plants, especially undesirable plants such as weeds, may be resource-intensive and/or difficult. While images of desired crops may be captured relatively frequently, pictures of undesirable crops such as weeds may be less common. Accordingly, techniques are described herein for generating synthetic training data with little or no human intervention that can be used to train machine learning model(s) such as CNNs to detect particular types of plants, such as weeds.

Figure 2:
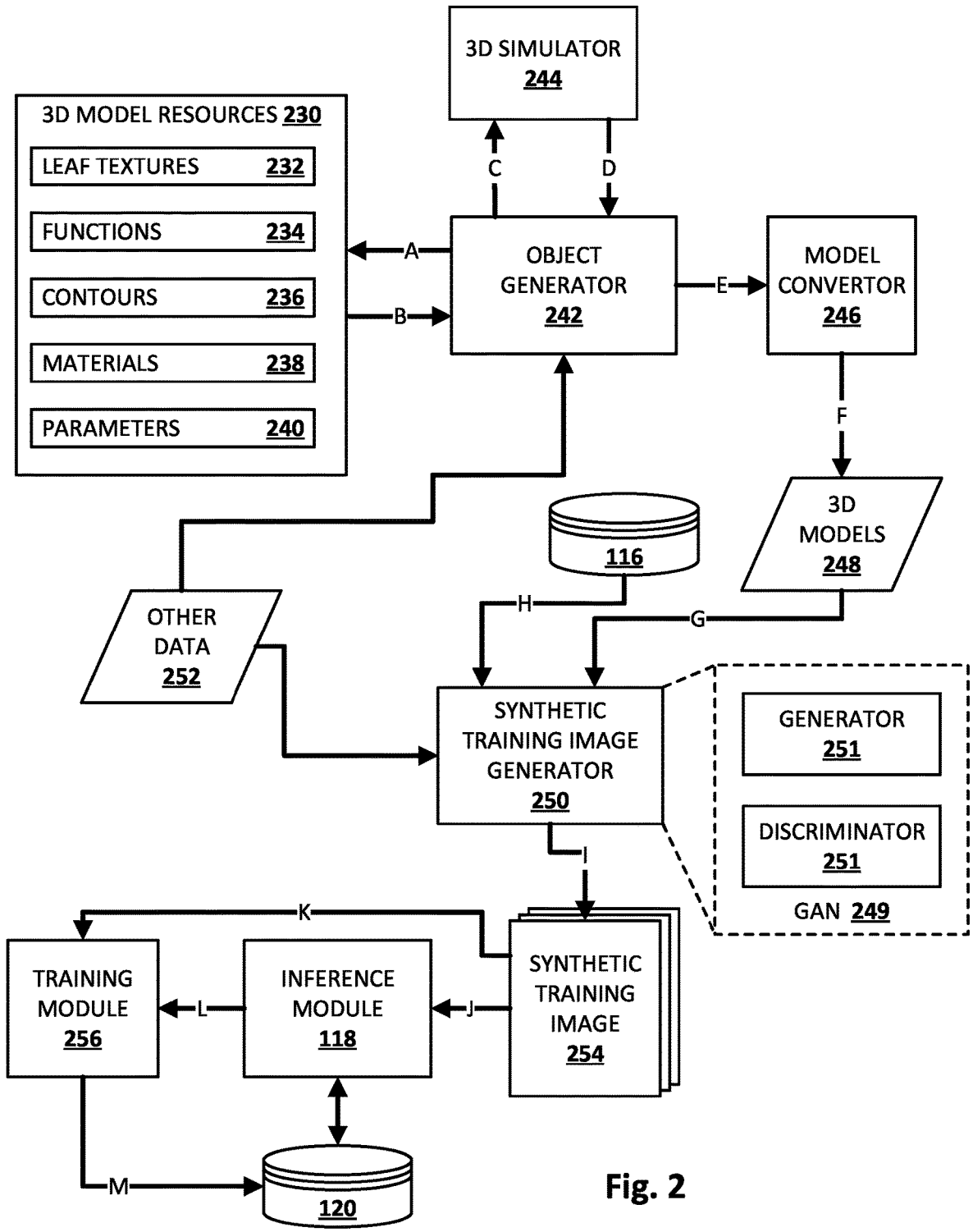
FIG. 2 schematically depicts components and a process for practicing selected aspects of the present disclosure, in accordance with various implementations.

FIG. 2 depicts an example process flow for generating synthetic training data in accordance with various implementations described herein. Starting at top left, 3D model resources 230 may include data, parameters, and/or any other information about plants, such as weeds, that may be useable to generate realistic 3D models of plants. 3D model resources 230 may include, for instance, leaf textures 232, various functions 234, contours 236 for leafs, stems, and/or other aspects of plants, materials 238, and miscellaneous parameters 240 such as leaf sizes, scale ratios, desired resolution, etc. Functions 234 may include, for instance, programmatic routines, computer-readable instructions, scripts, pseudo-code, algorithms, heuristics, statistics, etc., that are used, e.g., by an object generator 242 or 3D simulator 244, to generate 3D plant models. Materials 238 may include, for instance, data similar to texture data that is used to simulate different types of plant structures, such as stems.

A series of arrows A-M is depicted in FIG. 2 to demonstrate one example of how data may be processed in order to generate synthetic training images 254, and how those synthetic training images 254 may then be used to train one or more machine learning models stored in machine learning model database 120. At arrow A, object generator 242 (which may or may not be part of plant knowledge system 104 and may be implemented using any combination of hardware and computer-readable instructions) may randomly select various assets from 3D model resources 230.

This selection may be random or pseudo random in order that each 3D model plant that is generated for inclusion in training data is different from each other, as would be the case in real life. In some implementations, the random or pseudo random selection may be based at least in part on other data 252, which may include agricultural history of the area that was photographed and/or observable attributes of the area (e.g., evidenced in the digital image). For example, assets that are more consistent with the environmental conditions of the agricultural area depicted in the digital photograph may be weighted more heavily (and hence, more likely to be selected) than other assets that are less consistent with the environmental conditions. These randomly-selected assets may be returned to object generator 242 at arrow B.

At arrow C, the randomly-selected assets and/or an object representative thereof (e.g., an XML file that spells out how many leaves, their size, a size of the plant, a color of the plant, etc.) may be provided to 3D simulator 244, which also may or may not be part of plant knowledge system 104 and may be implemented using any combination of hardware or computer-readable instructions. Based on these objects and/or the assets represented/conveyed by these objects, 3D simulator 244 may generate 3D plant model(s) (also referred to as "3D synthetic plants") of the targeted plants. For example, to train a machine learning model to detect dandelions, 3D simulator 244 may generate a plurality of 3D model dandelion plants. 3D simulator 244 may return the generated 3D models to object generator 242 at arrow D or may provide them directly to another downstream component.

In some implementations, the other data 252 may be used, e.g., by object generator 242 and/or 3D simulator 244, to generate the objects/3D models. For example, as described previously, the other data 252 may affect probabilities of constituent assets of 3D resources 230 being selected stochastically. Other data 252 may include an agricultural history of an agricultural area (e.g., 112) of interest. The agricultural area of interest may be, for instance, a field or plot of which one or more digital images have been captured, e.g., by one or more robots $108_{1-M}$. These digital images may effectively be used as canvases on which 3D models can be graphically incorporated to generate the synthetic digital images 254. In fact, these digital images, prior to being augmented with synthetic plants, may be referred to herein as "canvas" digital images.

Other data 252 may additionally or alternatively include, for instance, an agricultural history of the area 112 during a time interval preceding capture of image data that depicts the agricultural area. This agricultural history may include a wide variety of data about the agricultural area being depicted, such as precipitation data, stewardship data, soil data, weather data, fertilizer data, herbicide data, pest data, plant disease data, etc.

In some implementations, the other data 252 may include time-series data corresponding to one or more environmental conditions of the agricultural area, such as daily precipitation, daily sun exposure, periodic fertilizer application, periodic temperature readings, periodic soil composition measurements, periodic soil pH levels, and/or pesticide applications, to name a few. In some such implementations, object generator 242 and/or 3D simulator 244 may employ a time-series machine learning model such as a recurrent neural network ("RNN"), a long short-term memory ("LSTM"), a gated recurrent unit ("GRU") network, etc., to process this time-series data and generate 3D synthetic plants. For example, a new 3D version of a synthetic plant may be generated at each iteration of an RNN or LSTM based on the previous iteration's output and the current iteration's corresponding time series data.

A time-series machine learning model such as an RNN, LSTM, or GRU-based network may be trained to generate 3D plant models in various ways. For example, a temporal sequence of ground truth digital images depicting examples of a weed to be modeled may be captured, e.g., from a controlled test garden in which the weed is purposefully grown. Other time-series data indicative of environmental conditions of the controlled test garden when the images were captured may also be obtained. The environmental conditions time-series data may then be iteratively applied as inputs across the time-series machine learning model to generate, at each iteration, output indicative of expected weed progression. In some implementations, the output of a previous iteration may also be applied as input across the time-series model, in effect providing the time-series model with memory.

In some implementations, the output generated at each iteration may include 3D plant models of the weeds at that point in time. In other implementations the output may include predicted features of weeds at that point in time, such as leaf size, number of leaves per weed, weed height, leaf color, etc. In either case, the output may be compared to ground truth attribute(s) of weeds depicted in the corresponding ground truth digital image of the temporal sequence. The difference or error between the output and the ground truth may be used to train the time-series machine learning model, e.g., using techniques such as back propagation, gradient descent, etc.

As a consequence of utilizing other data 252, especially with time-series machine learning models, the resultant 3D plant models may be highly realistic, particularly in the context of the agricultural area 112 depicted in the digital image onto which they are graphically incorporated. For example, if the environmental conditions in agricultural area 112 have been favorable to a type of weed being modeled, then the 3D plant models may correspond to healthy weeds, e.g., with robust color (e.g., deep and uniform green), large and/or numerous leaves, strong/numerous branches, etc. By contrast, if the environmental conditions in the agricultural area have been inhospitable for the type of weed being modeled, the resultant 3D plant models may correspond to less healthy weeds, e.g., that are smaller and/or include less leaves, and/or that have a less healthy color (e.g., brown spots or grayish color).

It might be the case that in the agricultural area 112 of interest, strong action has been taken to reduce or eliminate the type of weed being modeled. For example, the agricultural history of the agricultural area 112 may indicate periodic application of herbicides that target the weed being modeled. Consequently, the digital image capturing the agricultural area 112 may depict few, if any weeds. Nonetheless, it may be desired to use the digital image as a canvas for synthetic training data.

Accordingly, in some implementations, one or more data points of agricultural history may be modified in order to influence generation of 3D plant models so that the resultant models have desired attribute(s). For example, the fact that an herbicide has been applied periodically may be ignored or suppressed when generating the 3D plant models to ensure that the 3D plant models appear healthier. As another non-limiting example, precipitation and/or sunlight exposure may be inflated from ground truth reality to improve the appearance of the resultant 3D plant models.

In some implementations, object generator 242 and/or 3D simulator 244 may take into account conditions at the time a digital image of the agricultural area 112 of interest was captured. For example, the digital image may depict the agricultural area 112 under a lighting condition that existed in the agricultural area when a camera captured the digital image. The sun may be out or occluded by clouds. Depending on the time of day and/or time of year, the sun may be at different positions in the sky. Consequently, the agricultural area may be illuminated in different ways with different amounts of light. Moreover, the sun's position in the sky at the time the image was captured may cause objects such as plants to cast shadows of various shapes and sizes. Therefore, in some implementations, other data 252 may include attribute(s) of the lighting condition at the time the digital image of the agricultural area was captured. This lighting condition data may be conveyed in the image itself or extracted and included, for instance, as metadata that accompanies the image.

In some implementations, object generator 242 and/or 3D simulator 244 may render 3D plant models to include visual features that are dictated based on the lighting condition. For example, leaves may exhibit one hue under a cloudy sky, another under a noon sun, another at dawn/dusk, etc. And depending on the textures of the 3D plant models, their leaves and/or other structure may reflect various amounts of sunlight. Additionally or alternatively, in some implementations, an observed wetness of the area may be accounted for. For example, if the digital image was captured during or soon after a rain storm, plants in the area may have a shimmer due to their wetness. The presence of such a shimmer may be determined, e.g., from the image itself or from environmental data associated with the agricultural area, and used to create a similar shimmer on 3D plant models.

Referring back to FIG. 2, in some implementations, at arrow E, object generator 244 may provide the 3D plant model(s) to a model convertor 246. As with other components in FIG. 2, model convertor 246 may or may not be part of plant knowledge system 104 and may be implemented using any combination of hardware and/or computer-readable instructions. At arrow F, model converter 246 may be configured to convert the 3D models into various formats of 3D models 248, some of which may be standardized formats for representing 3D objects, such as *.obj, *.mtl, *.urdf, and so forth. In other implementations, model convertor 246 may be omitted.

At arrow G, the 3D plant models 248 may be provided (from model convertor 246, object generator 242, or even 3D simulator 244) to a synthetic training image generator 250. Synthetic training image generator 250, which again may be implemented using any combination of hardware and/or computer-readable instructions, may be configured to carry out selected aspects of the present disclosure to generate synthetic training data, such as one or more synthetic training images 254. For example, at arrow H, one or more images may be retrieved from imagery database 116 (e.g., via vision data module 114). These images may depict agricultural area(s) (e.g., 112) under a variety of conditions. For example, multiple images may capture the same agricultural area under a cloudy sky, during a rain storm, on a sunny day, on a foggy day, at different times of day (at which points the sun will be at different positions in the sky), and so forth.

In addition to the imagery retrieved from database 116, in some implementations, at least some of the other data 252 mentioned previously may also be retrieved and used by synthetic training image generator 250 for use in generating synthetic training images 254, particularly for graphically incorporating the 3D plant models into the canvas digital images that depict the agricultural area 112. This may include, for example, the other data 252 that coincides with the agricultural area(s) depicted in the imagery, such as environmental conditions leading up to and including the moment at which the imagery was captured. This may also include the lighting condition mentioned previously. For example, synthetic training image generator 250 may render adjacent 3D plant models on the two-dimensional canvas image and shadows that simulate real life shadows that would be present if the 3D plant models were actually present in the agricultural area 112.

As shown in FIG. 2 and mentioned previously, synthetic training image generator 250 may be configured to obtain a digital image that captures an area from database 116. Based on this lighting condition at the time the image was captured and/or based on an agricultural history of the area, synthetic training image generator 250 may generate a synthetic training image 254 to depict the plurality of 3D synthetic plants in the agricultural area. In some implementations, the generating may include graphically incorporating the plurality of 3D plant models into the digital image capturing the agricultural area 112, taking into account the lighting condition at the time the underlying digital image was captured.

In some implementations, and as shown in the dashed exploded view, synthetic training image generator 250 may employ a generator model 251 that is trained as part of a larger generative adversarial network ("GAN") 249 to generate synthetic training images 254 that are as realistic as possible. Such a GAN 249 may also include a discriminator model 253 that is trained to generate output that predicts whether an input image is, for instance, "synthetic" or "real." The generator model 251 and discriminator model 253 may or may not be trained in tandem. The discriminator model 253 may be fed both real images (e.g., captured using a camera) and synthetic images generated by the generator model 251. The fact that the discriminator model 253 correctly classifies an image as synthetic may be used as a negative training example that causes the generator model 251 to improve its own performance. When the discriminator model 253 incorrectly classifies a "real" image as synthetic, the discriminator model 253 may be trained to improve its own performance. The generator model 251 may be considered to be sufficiently trained when it is able to "fool" the discriminator model 253, e.g., more than some threshold number of times.

In some implementations, synthetic training image generator 250 may be further configured to space the plurality of 3D synthetic plants from each other in the synthetic training image 254 based on various pieces of other data 252, such as environmental conditions leading up to the moment the digital image was captured and/or the presence of other plants. If an agricultural area is growing a robust and healthy crop of desired plants, for instance, these plants may choke out other, less desirable plants such as weeds. Accordingly, synthetic training image generator 250 may space 3D synthetic weeds relatively far from each other in a digital image that depicts healthy and robust crops. On the other hand, if the crops are less robust or healthy, there may be more opportunity for weeds to flourish. Accordingly, synthetic training image generator 250 may space 3D synthetic weeds relatively close to each other in a digital image that depicts unhealthy and/or sparse crops. Similarly, synthetic training image generator 250 may space 3D synthetic weeds or other plants from each other based on environmental conditions in the agricultural area. If there is a drought, and the 3D synthetic plants are intended to model weeds that tend to struggle in dry conditions, the 3D synthetic plants may be spaced relatively far from each other.

Referring back to FIG. 2, at arrow I, synthetic training image generator 250 may output synthetic training images 254. At arrow J, an inference module 118 (e.g., the same as or sharing characteristic(s) with inference module 118 of FIG. 1) may apply the synthetic training images 254 as input across one or more machine learning models (e.g., CNN) from machine learning model database 120. Meanwhile, at arrow K, synthetic training images 254 may also be provided to a training module 256. Because synthetic training images 254 are generated using 3D synthetic plants that are graphically incorporated at known pixel locations, they may effectively form annotated or labeled training data that can be compared by training module 256 with the output generated by inference module 118 at arrow L (e.g., pixel-wise plant classifications similar to 122 in FIG. 1). The error between the output of inference module 118 and the annotations/labels can be used by training module 256 to train the machine learning model, which is updated in database at arrow M. In some implementations, non-synthetic (i.e. ground truth) images depicting agricultural areas in which targeted plants are present may also be used by training module 256 as training data. In some such implementations, these ground truth images may be labeled, e.g., using bounding boxes or on a pixel-wise basis, to identify locations of targeted plants.

Figure 3A:
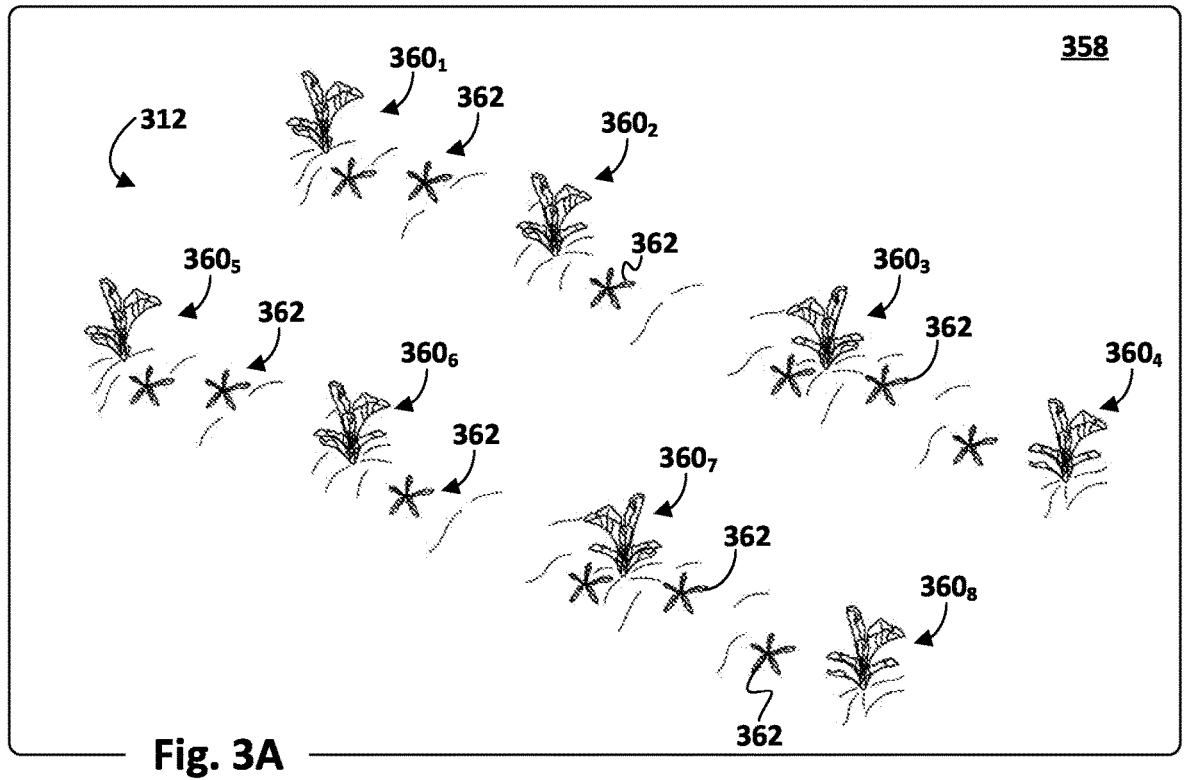
FIG. 3A and FIG. 3B depict a digital image of an agricultural area at a first stage in a crop cycle, before and after disclosed techniques have been employed, in accordance with various implementations.
Figure 3B:
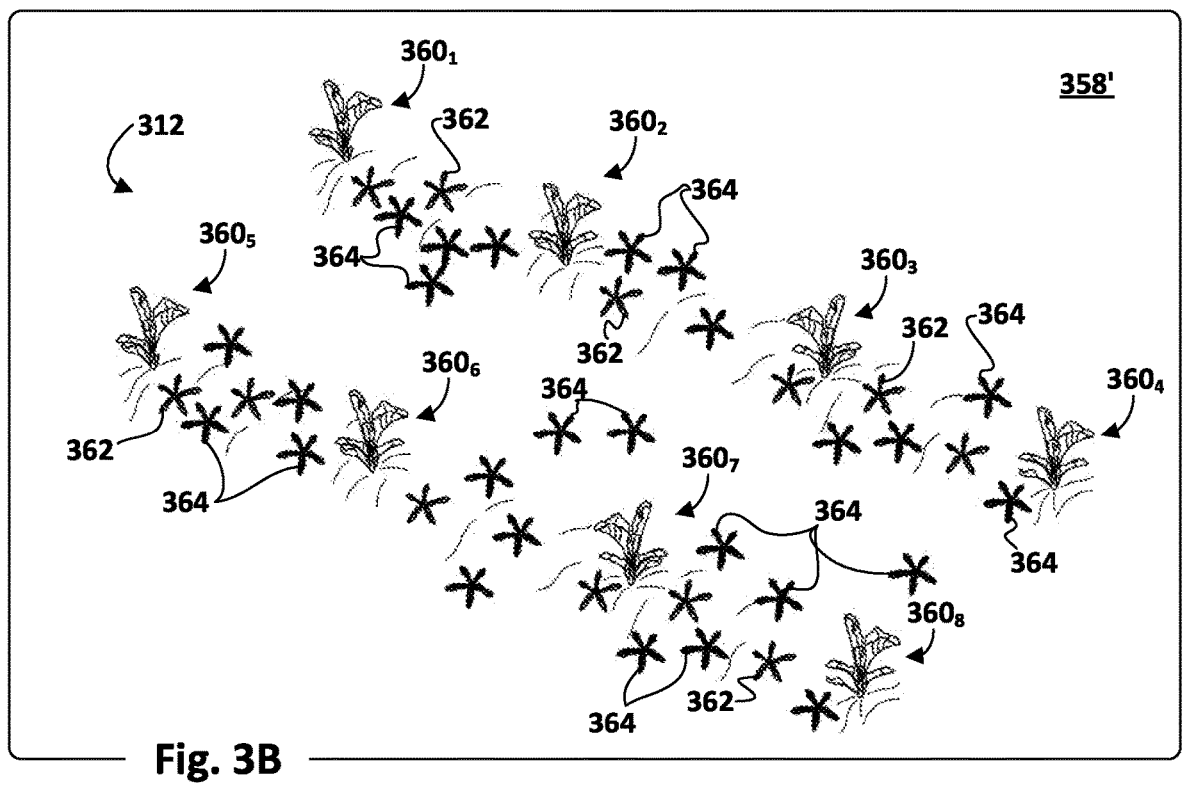

FIGS. 3A and 3B depict one example of how a digital image of an agricultural area 112 may be modified using techniques described herein to generate a synthetic training image. FIG. 3A depicts a digital image 358 that captures an agricultural area 312. Digital image 358 may have been captured by, for instance, a robot equipped with a vision sensor as the robot traverses through agricultural area 312 in search of weeds to remediate. A plurality of desired plants $360_{1-8}$ are currently growing in agricultural area 312, and consequently are depicted in digital image 358. Desired plants $360_{1-8}$ in FIG. 3A are relatively small because they are at an early stage in their crop cycle. Also growing in agricultural area 312 are several different undesired plants in the form of what will be referred to herein as "ground truth" weeds 362 (only some of which are labeled for the sake of clarity). Using techniques described herein, digital image 358 may be treated as a canvas that is augmented with synthetic plants, e.g., synthetic weeds, to generate the synthetic training image 358' depicted in FIG. 3B.

In FIG. 3B, a plurality of synthetic plants 364 have been graphically incorporated into digital image 358 alongside desired plants $360_{1-8}$ and ground truth weeds 362 to yield augmented digital image 358'. Notably, because desired plants $360_{1-8}$ are in an early stage of their crop cycle and therefore are relatively small in size, there is considerable space between them. This space may be fertile ground for undesired plants. In unaltered digital image 358 depicted in FIG. 3A, a relatively small number of ground truth weeds 362 are growing among desired plants $360_{1-8}$ because, for instance, agricultural personnel have been diligent in weed remediation. In some implementations, synthetic versions of desired plants such as crops may also be generated and added to the image if desired.

In the example of FIGS. 3A-B, this diligence in weed remediation (which may be part of other data 252 mentioned previously) may have been suppressed or ignored in generating synthetic training image 358'. Consequently, because there is a relatively large amount of space available for weed growth between desired crops $360_{1-8}$, there are a relatively large number of synthetic weeds 364 added to synthetic training image 358'. However, had the diligent weed remediation been taken into consideration when generating synthetic training image 358', a smaller number of synthetic weeds 364 may have been added, and/or those synthetic weeds 364 may have been smaller.

In some implementations, observable attribute(s) of plants in digital image 358—including ground truth weeds 362 and/or desired plants $360_{1-8}$—may be detected, e.g., via image processing. These observable attributes may be used (e.g., by any of components 242 and/or 244 in FIG. 2) to generate synthetic weeds 364 that appear consistent with the ground truth weeds 362 (as would likely be the case in nature). These observable attributes may include, for instance, color, leaf counts, sizes, apparent crop cycle stages, etc. In some such implementations, these observable attributes may be used as part of other data 252 to generate 3D synthetic models and/or to graphically incorporate those 3D synthetic models into digital image 358 to yield synthetic training data 358'. That is why in FIG. 3B, synthetic weeds 364 are virtually indistinguishable from ground truth weeds 362 (only subsets of both are labeled for clarity). As mentioned previously, in some implementations, the random or stochastic selection of assets that occurred at arrow A in FIG. 2 may be based at least in part on these observable attributes. For example, one or more assets of 3D resource 230 that are available for random selection may be weighted more or less heavily depending on their consistency with conditions on the ground at the time the digital image was captured.

Figure 4A:
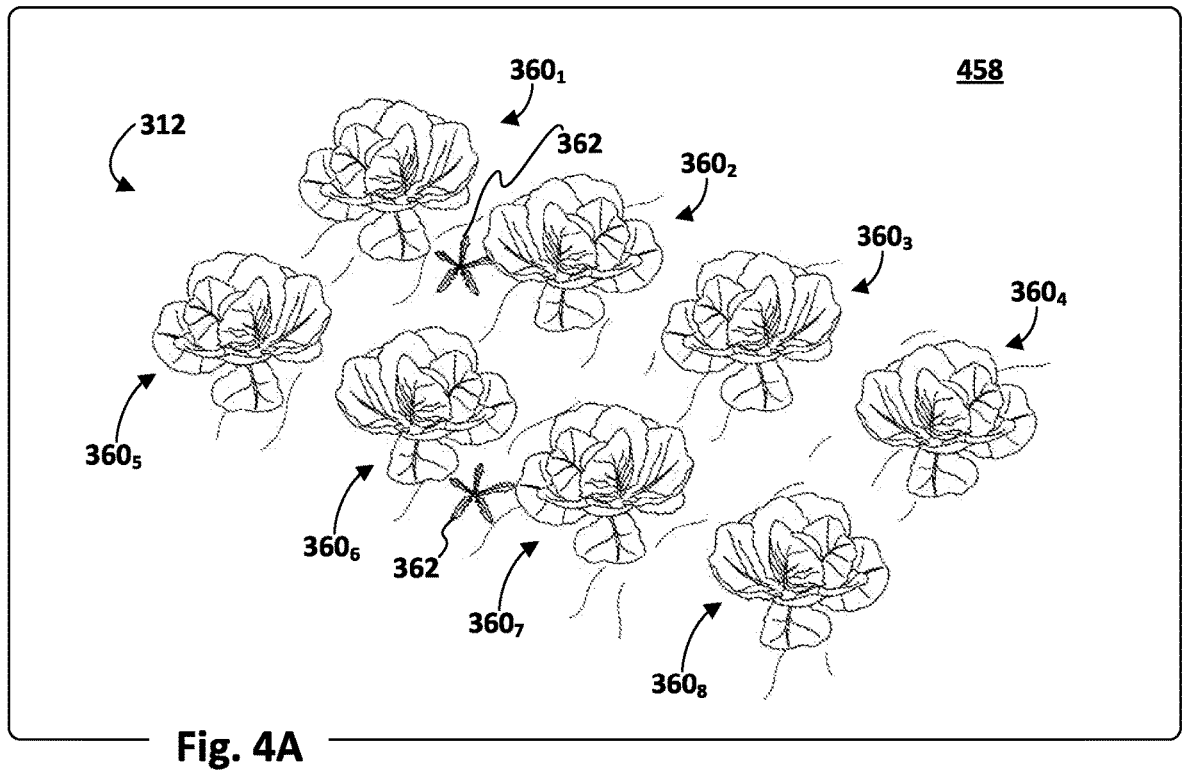
FIG. 4A and FIG. 4B depict a digital image of an agricultural area at a second stage in a crop cycle, before and after disclosed techniques have been employed, in accordance with various implementations.
Figure 4B:
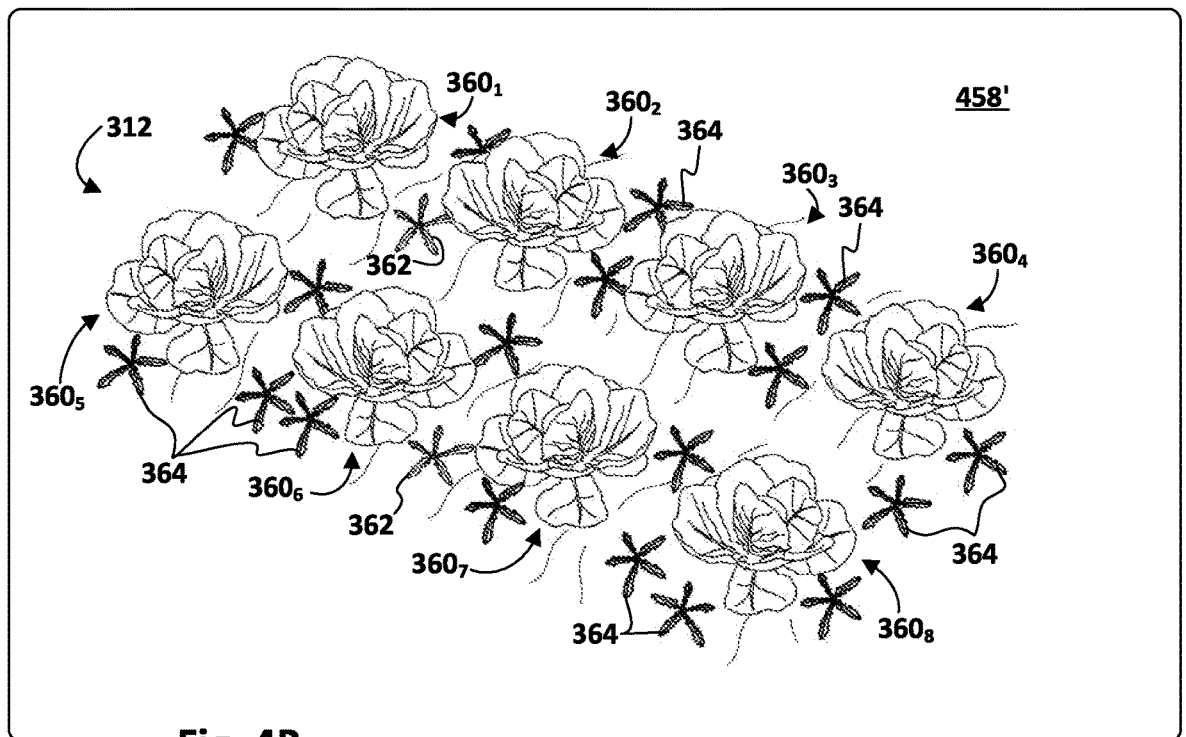

Under different circumstances, synthetic weeds 364 may be at different volumes, may be spaced apart differently, and/or may be in different states than depicted in FIG. 3B. FIGS. 4A and 4B illustrate how synthetic weeds 364 may be added to a different digital image 458 of the same agricultural area 312 during a later stage in the crop cycle. As shown in FIG. 4A, desired plants $360_{1-8}$ are much larger than they were in FIG. 3A. Consequently, there is less space between them for other plants such as weeds to flourish. Put another way, the desired plants $360_{1-8}$ "choke out" other plants to some extent. Accordingly, only two ground truth weeds 362 are present in agricultural area 312 in FIG. 4A.

As was the case with FIGS. 3A-B, in FIGS. 4A-B, these observable attributes of desired plants $360_{1-8}$ and/or ground truth weeds 362 in digital image 458 may be used to generate synthetic weeds 364 and/or to incorporate them into synthetic training image 458'. In FIG. 4B, a number of synthetic weeds 364 that are added is selected based at least in part on the size and/or open space between desired plants $360_{1-8}$. Because desired plants $360_{1-8}$ are larger at this later stage of their crop cycle, thereby leaving less open space between them, the number of synthetic weeds 364 added to synthetic training image 458' in FIG. 4B is less than the number of synthetic weeds 364 added to synthetic training image 358' in FIG. 3B.

Figure 5:
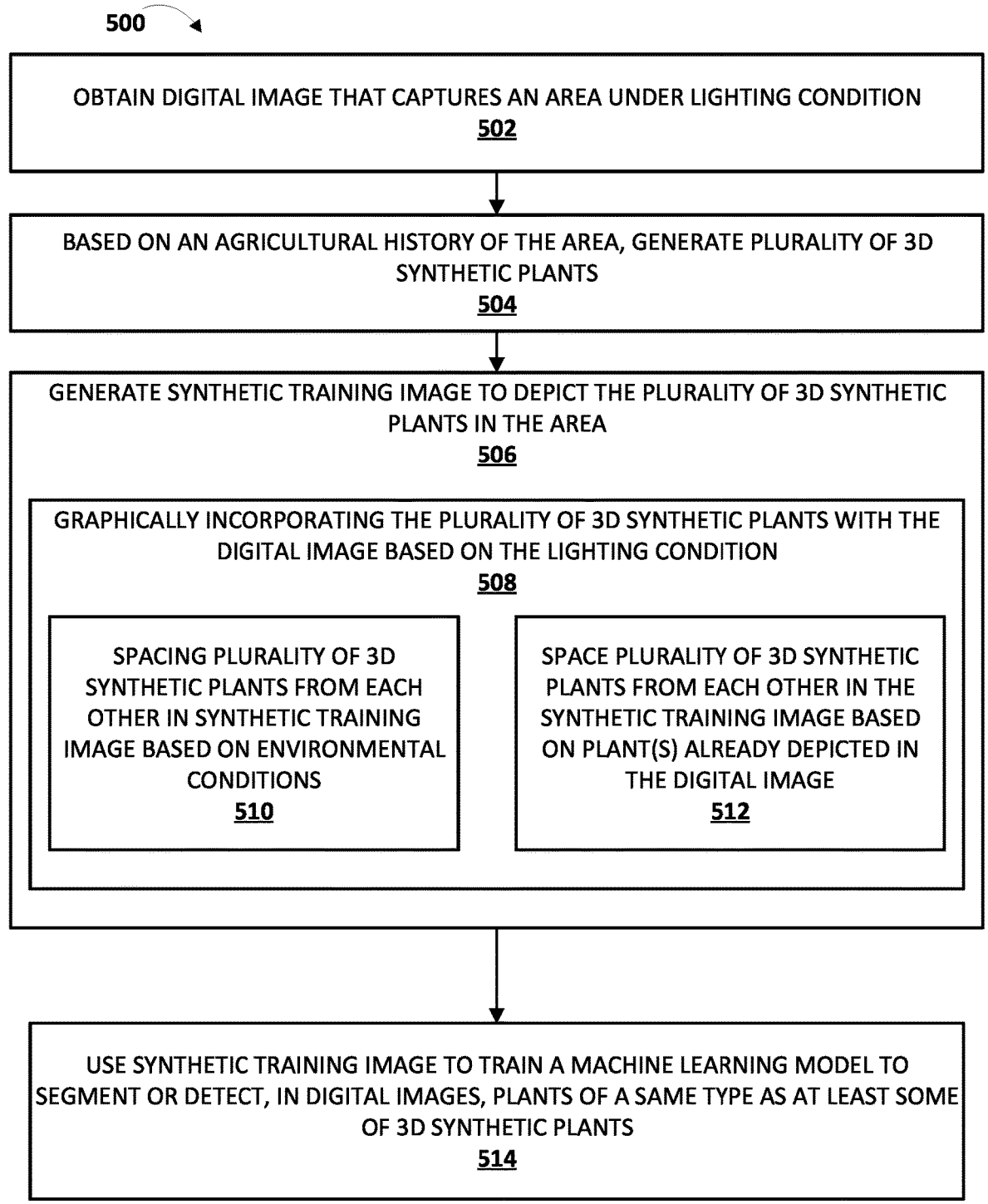
FIG. 5 is a flowchart of an example method in accordance with various implementations described herein.

FIG. 5 illustrates a flowchart of an example method 500 for practicing selected aspects of the present disclosure. The operations of FIG. 5 can be performed by one or more processors, such as one or more processors of the various computing devices/systems described herein, such as by plant knowledge system 104. For convenience, operations of method 500 will be described as being performed by a system configured with selected aspects of the present disclosure. Other implementations may include additional operations than those illustrated in FIG. 5, may perform step(s) of FIG. 5 in a different order and/or in parallel, and/or may omit one or more of the operations of FIG. 5.

At block 502, the system may obtain a digital image that captures an area, such as agricultural area 112, 312. In various implementations, the digital image may depict the area under a lighting condition that existed in the area when a camera captured the digital image. As noted previously, this camera may be operated by agricultural personnel and/or by a robot 108. Additionally, the lighting condition may include, for instance, information about cloud cover (e.g., totally cloudy, partially cloudy, 35% cloudy, sunny, etc.), a position of the sun in the sky (which may vary depending on time of day, time of year), an intensity of the sunlight (which may depend on cloud cover, fog, time of day/year, etc.), and so forth. In some implementations, an artist's (e.g., who is expert in agriculture) rendering of an agricultural area may be used in addition to or instead of a digital image of a real-world agricultural area.

Based at least in part on an agricultural history of the area, at block 504, the system, e.g., by way of object generator 242 and/or 3D simulator 244, may generate a plurality of 3D synthetic plants. As described previously, the agricultural history of the area may include a wide variety of data points (time-series or otherwise) that may be used when generating 3D synthetic plants. This agricultural history may include, but is not limited to, environmental conditions (e.g., weather, soil composition, temperature, precipitation, sunlight exposure, pH levels), agricultural stewardship (e.g., application of herbicides, pesticides, and/or fertilizers, weed remediation data, irrigation history), time-series data corresponding to a plurality of environmental conditions of the area, and so forth.

Additionally or alternatively, the system, e.g., by way of object generator 242 and/or 3D simulator 244, may generate the 3D synthetic plants based on observable attributes of a digital image (e.g., 358, 458) from imagery database 116, such as size/shape/color of existing plants, the lighting condition that exists in the digital image, etc. Indeed, because at least some observable attributes represent, in effect, a culmination or outcome of the agricultural history of the area up to the moment at which the digital image was captured, those observable attributes are not necessarily distinct from the agricultural history of the area. In fact, in some implementations, the system may generate 3D synthetic plants exclusively based on the observable attributes of the digital image.

At block 506, the system, e.g., by way of synthetic training image generator 250, may generate the synthetic training image to depict the plurality of 3D synthetic plants in the area. In various implementations, the generating of block 506 may include, at block 508, graphically incorporating the plurality of 3D synthetic plants with the digital image based on the lighting condition. In some implementations, the 3D synthetic plants may be 3D models, whereas the digital image into which they are being graphically incorporated may be two-dimensional. Accordingly, in some implementations, the graphical incorporation of block 508 may include "flattening" the 3D synthetic plants into two-dimensional representations, and superimposing those flattened representations in the two-dimensional image (e.g., replacing pixels of the image of synthetic pixels of the 3D synthetic plants).

In some implementations, the graphically incorporating of block 508 may include, at block 510, spacing the plurality of 3D synthetic plants from each other in the synthetic training image based on various environmental conditions that existed in the area during a time interval preceding capture of the digital image that captures the area. Suppose the area had undergone a drought recently. Drought-tolerant weeds may be simulated as numerous, healthy, and/or densely-spaced. By contrast, drought-intolerant weeds may be simulated as less numerous, less healthy, and/or more sparsely distributed. Similarly, if herbicide has been applied in the area (and assuming that application is not deliberately suppressed or ignored), then herbicide-resistant weeds may be simulated as more numerous, healthy, and/or densely-spaced, whereas herbicide-susceptible weeds may be simulated as less numerous, less healthy, and/or more sparsely distributed.

Additionally or alternatively, in some implementations, the graphically incorporating of block 508 may include, at block 512, spacing the plurality of 3D synthetic plants from each other in the synthetic training image based on plant(s) already depicted in the image. For example, in FIG. 3B and FIG. 4B, the spacing (and amount) of synthetic weeds 364 was selected based at least in part on the extent the desired plants $360_{1-8}$ would allow for encroachment of other plants, such as weeds. Consequently, more synthetic weeds were added to digital image 358 (earlier in the crop cycle) than to digital image 458 (later in the crop cycle when desired plants might choke out weeds more effectively).

At block 514, the system may use the synthetic training image generated at block 506 to train a machine learning model to segment or detect, in digital images, plants of a same type as at least some of the 3D synthetic plants. For example, a CNN may be trained using the synthetic training image (and many more like it in some cases) to segment a digital image into different segments, some of which may represent the targeted plant type. In some implementations, the output of the CNN may be an image with annotations (e.g., pixel-wise or otherwise) identifying the targeted plant type.

In some implementations, the machine learning model being trained at block 514 may be a time-series plant detection machine learning model such as a RNN, LSTM, GRU, etc. As mentioned previously, such a time-series plant detection machine learning model may be trained, for instance, using synthetic training images generated as described previously, in combination with time-series agricultural data. For example, temporal sequence of synthetic training images of an area may be generated at block 506. The 3D synthetic plants may change across each successive synthetic training image, e.g., by growing larger and fuller if the conditions are favorable or wilting if the conditions are unfavorable. In some implementations, the progression of these 3D synthetic plants may result from the processing of corresponding time-series agricultural data.

In some implementations, at block 514, this temporal sequence of synthetic training images may be iteratively applied, along with corresponding time-series agricultural data, as inputs for the time-series plant detection machine learning model. Any error in the detection or classification of targeted plants may be used to train the time-series machine learning model. Such a time-series plant detection machine learning model may also be trained with ground truth data such as temporal sequences of real (i.e. non-synthetic) images of targeted plants over time.

Figure 6:
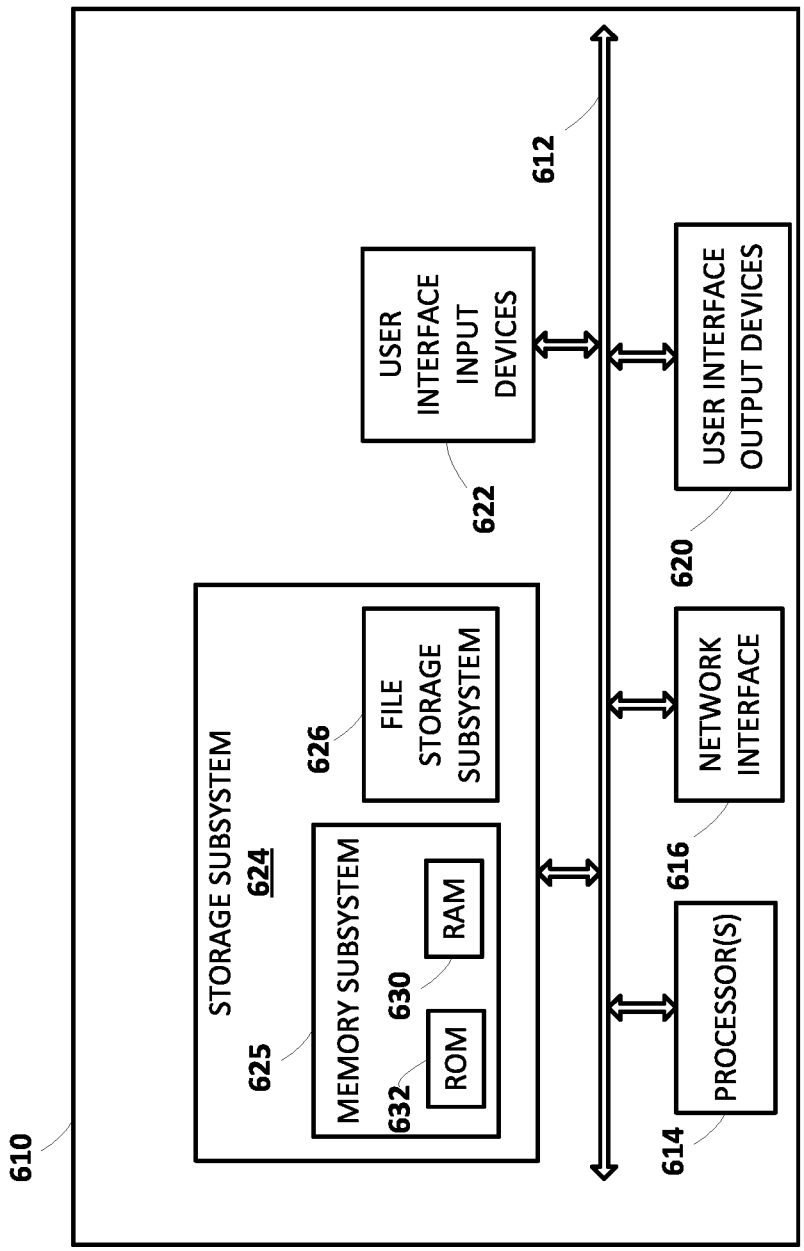
FIG. 6 schematically depicts an example architecture of a computer system.

FIG. 6 is a block diagram of an example computing device 610 that may optionally be utilized to perform one or more aspects of techniques described herein. Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In some implementations in which computing device 610 takes the form of a HMD or smart glasses, a pose of a user's eyes may be tracked for use, e.g., alone or in combination with other stimuli (e.g., blinking, pressing a button, etc.), as user input. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, one or more displays forming part of a HMD, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of method 500 described herein, as well as to implement various components depicted in FIGS. 1 and 2.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method for generating a synthetic training image, the method implemented using one or more processors and comprising:
   obtaining a digital image that captures an area;
   based at least in part on an agricultural history of the area, generating a plurality of three-dimensional synthetic plants; and
   generating the synthetic training image to depict the plurality of three-dimensional synthetic plants in the area, wherein the generating includes graphically incorporating the plurality of three-dimensional synthetic plants with the digital image at a spacing that is determined based at least in part on a feature of the area when the area was captured in the digital image.

2. The method of claim 1, wherein the feature of the area comprises an environmental condition of the area.

3. The method of claim 2, wherein the environmental condition of the area comprises one or more plants already depicted in the digital image.

4. The method of claim 3, wherein the plurality of three-dimensional plants simulate weeds targeted for remediation and the one or more plants already depicted in the digital image comprise crops targeted for harvest.

5. The method of claim 3, wherein the plurality of three-dimensional plants simulate crops targeted for harvest and the one or more plants already depicted in the digital image comprise weeds targeted for remediation.

6. The method of claim 1, wherein the feature of the area comprises a plurality of environmental conditions that existed in the area during a time interval preceding capture of the digital image that captures the area.

7. The method of claim 1, further comprising analyzing the digital image to identify the feature of the area.

8. The method of claim 1, further comprising using the synthetic training image to train a machine learning model to segment or detect, in digital images, plants of a same type as at least some of the three-dimensional synthetic plants.

9. A system for generating a synthetic training image, the system comprising one or more processors and memory storing instructions that, in response to execution of the instructions, cause the one or more processors to:
   obtain a digital image that captures an area;
   based at least in part on an agricultural history of the area, generate a plurality of three-dimensional synthetic plants; and
   generate the synthetic training image to depict the plurality of three-dimensional synthetic plants in the area, wherein the synthetic training image is generated by graphical incorporation of the plurality of three-dimensional synthetic plants with the digital image at a spacing that is determined based at least in part on a feature of the area when the area was captured in the digital image.

10. The system of claim 9, wherein the feature of the area comprises an environmental condition of the area.

11. The system of claim 10, wherein the environmental condition of the area comprises one or more plants already depicted in the digital image.

12. The system of claim 11, wherein the plurality of three-dimensional plants simulate weeds targeted for remediation and the one or more plants already depicted in the digital image comprise crops targeted for harvest.

13. The system of claim 11, wherein the plurality of three-dimensional plants simulate crops targeted for harvest and the one or more plants already depicted in the digital image comprise weeds targeted for remediation.

14. The system of claim 9, wherein the feature of the area comprises a plurality of environmental conditions that existed in the area during a time interval preceding capture of the digital image that captures the area.

15. The system of claim 9, further comprising analyzing the digital image to identify the feature of the area.

16. The system of claim 9, further comprising using the synthetic training image to train a machine learning model to segment or detect, in digital images, plants of a same type as at least some of the three-dimensional synthetic plants.

17. A non-transitory computer-readable medium for generating a synthetic training image, the medium storing instructions that, in response to execution of the instructions, cause one or more processors to:
   obtain a digital image that captures an area;
   based at least in part on an agricultural history of the area, generate a plurality of three-dimensional synthetic plants; and
   generate the synthetic training image to depict the plurality of three-dimensional synthetic plants in the area, wherein the synthetic training image is generated by graphical incorporation of the plurality of three-dimensional synthetic plants with the digital image at a spacing that is determined based at least in part on a feature of the area when the area was captured in the digital image.

18. The non-transitory computer-readable medium of claim 17, wherein the feature of the area comprises an environmental condition of the area.

19. The non-transitory computer-readable medium of claim 18, wherein the environmental condition of the area comprises one or more plants already depicted in the digital image.

20. The non-transitory computer-readable medium of claim 19, wherein the plurality of three-dimensional plants simulate weeds targeted for remediation and the one or more plants already depicted in the digital image comprise crops targeted for harvest.

* * * * *